Aug. 13, 1968    J. L. NORTON    3,396,942
ROTARY BLADED MACHINES

Filed Aug. 29, 1967    3 Sheets-Sheet 1

Inventor
JAMES LANSDOWNE NORTON
By STEVENS, DAVIS, MILLER & MOSHER
Attorneys

United States Patent Office

3,396,942
Patented Aug. 13, 1968

3,396,942
ROTARY BLADED MACHINES
James Lansdowne Norton, Bristol, England, assignor to Bristol Siddeley Engines Limited, Bristol, England, a British company
Filed Aug. 29, 1967, Ser. No. 664,204
5 Claims. (Cl. 253—59)

ABSTRACT OF THE DISCLOSURE

A rotary-bladed fluid-flow machine fitted with a device which actuates a danger signal when the peak value of the pressure fluctuations which occur immediately radially outwards of a ring of rotor blades and which are sensed by a tapping through the casing, exceeds a predetermined value, said device, for example, being a bistable fluidic switch in which the throughflow can be latched over a biasing flow which is connected to the tapping, when the pressure of the biasing flow exceeds, for at least the moment, said predetermined value.

---

This invention concerns rotary bladed fluid flow machines such as gas turbines and air compressors.

When such machines are in operation, a single blade can be distorted or even broken off. This can arise from centrifugal stress or from the impact of a foreign body on one of the blades.

The loss of the blade can lead to great damage in a machine rotating at high speed and have results which, in the case of an aircraft installation, can be fatal.

An object of this invention is to provide a device which can sense the loss or damage of a blade in the greatest possible time so that the machine can be shut down before the damage becomes widespread.

In rotary bladed fluid flow machines a stationary point in the vicinity of the rotor blades experiences a steady pressure, or a pattern of pressure variation showing a slight fluctuation as each successive blade passes. Such pressure characteristics apply to the normal condition of the machine, i.e. the condition when the blades are in order. When one of the blades is damaged, for example is either distorted or broken, the stationary point experiences an abnormal pressure fluctuation i.e. a fluctuation the magnitude of which is significantly greater than the magnitude of a fluctuation in the normal condition of the machine. The abnormality is of course cyclic having the same frequency on the rotation of the machine.

Machines according to this invention have a device past which the blades turn during their operation and which device is responsive to a cyclic pressure abnormality in the vicinity of the blades to detect the blade damage.

The time during which the device is exposed to the pressure pulse can be extremely short because of the speed of the rotor, and the fact that the gap caused by blade loss or damage forms only a small part of the periphery of the rotor. For example, in the case of the rotor of 30 inches shroud diameter, and having 100 blades, and running at 6,000 r.p.m. the time available for responding to a single blade loss would be less than 100 microseconds. A device capable of responding at such a speed would detect the damage during a single revolution of the rotor, which in the present example, would be ten milliseconds.

Preferably the blades have shrouds at their tips, which shrouds form a substantially continuous annular wall enclosing the blades, the device being outside the shrouds.

Preferably the device is a pneumatic relay.

Figure 1:
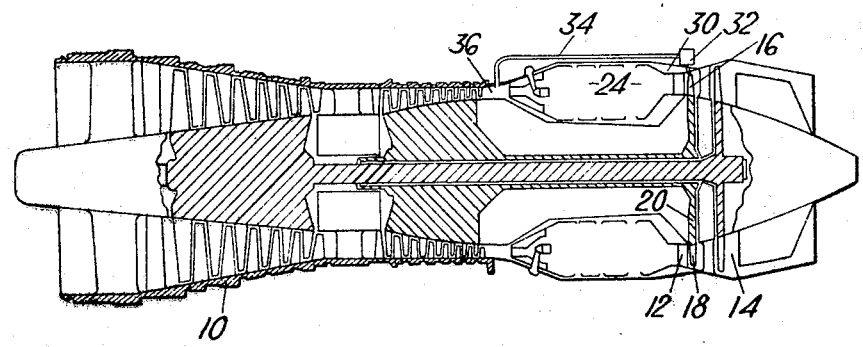
Figure 2:
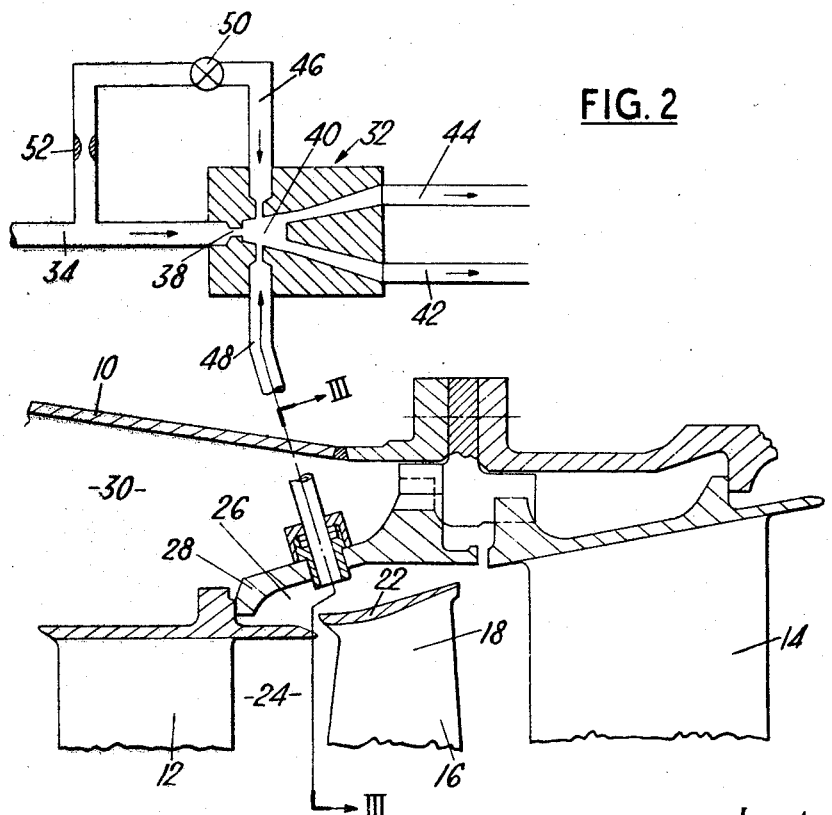
Figure 3:
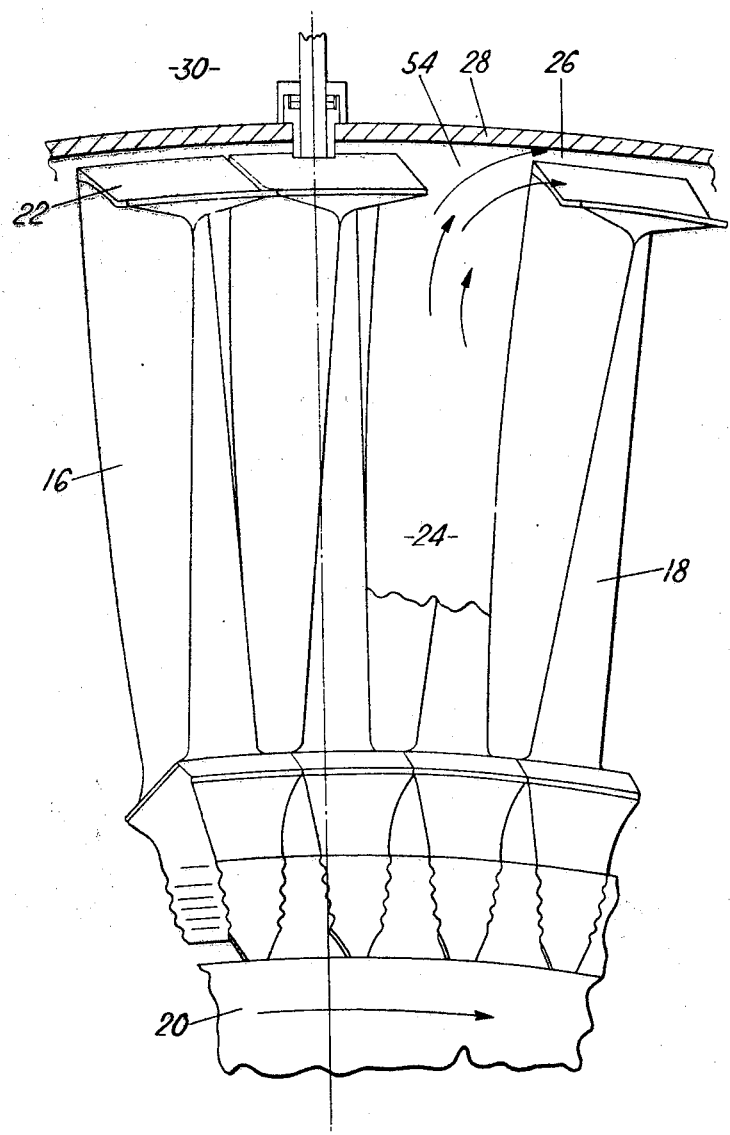
Figure 4:
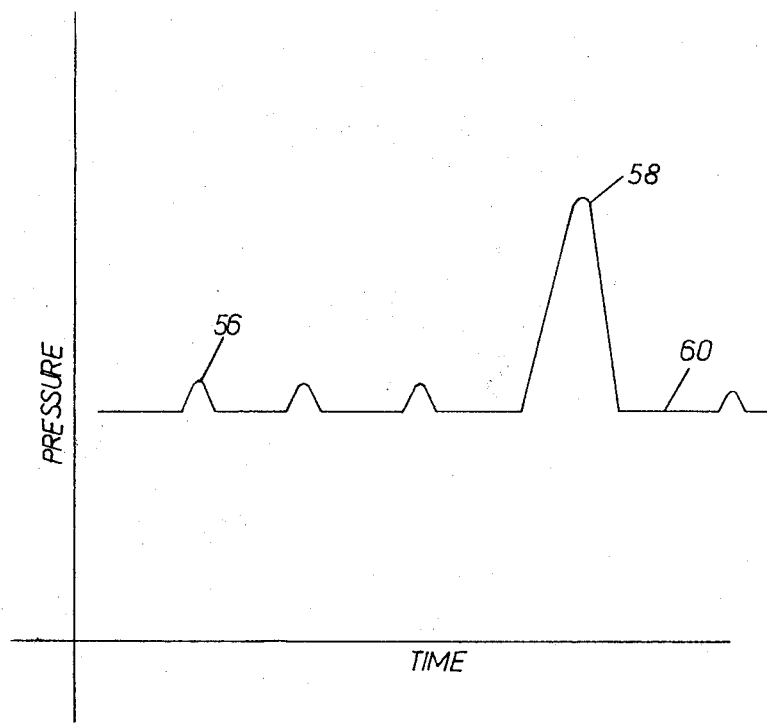

One form of apparatus according to this invention is described below with reference to the accompanying drawings in which:

FIGURE 1 is an axially sectioned elevation of a gas turbine engine;
FIGURE 2 is an enlarged sectioned elevation of a detail of FIGURE 1;
FIGURE 3 is a sectioned perspective view taken generally as indicated by the arrows III—III seen in FIGURE 2; and
FIGURE 4 is a graph of pressure changes resulting from damage to or loss of a blade.

The drawings show a casing 10 surrounding a turbine, the casing supporting first and second rings of the stator blades, 12 and 14 between which is situated a rotary ring 16 having blades 18. The blades 18 are fixed individually to a common disc 20, and each of them has an outer shroud 22 which co-operates with the shrouds of other blades to form a substantially continuous annular wall separating the fluid passage 24 through the turbine from an annular chamber 26 surrounding the shrouds. As seen best in FIGURE 2, the chamber 26 is outwardly bounded by an annular wall 28 which separates it from a space 30 within the casing 10.

A pneumatic relay 32 is secured to the wall 10, and has a power input duct 34 connected to a compressor delivery duct 36 of the engine, which thus provides a fluid pressure supply to the relay, through an inlet port 38. The inlet port 38 connects into a junction 40, as does a first outlet port 42, a second outlet port 44, and two inlet ports 46 and 48 described in detail below.

The relay 32 is bistable, and the connections into the junction 40 are arranged so that the flow from the inlet port 38 is set to flow into the first outlet port 42 when the blades are in order. This setting is produced by an input through the inlet port 46 which is connected through a valve 50 and a throttle 52 to the duct 34. The valve 50 is opened manually at the beginning of a flight programme (after the engine has been started) to deflect the flow from the port 38 to leave the junction 40 through the duct 42. Once deflected, the flow through the junction clings to the wall adjacent to it by the so-called coander effect. The said opening of the valve 50 therefore acts to set the relay, after which the valve can be closed again, closed being its normal position.

The bistable relay 32 is one of a kind which is well known per se and is known to have a fast response time.

The port 48 connects through the casing into the space 26. Its opening into the junction is arranged so that if a sufficiently strong fluid current issues from it, the current resets the relay 32 by causing the fluid flow from the port 38 to the duct 42 to be deflected so that it flows from the port 38 to the duct 44, clinging then to the opposite wall.

The duct 42 is connected to a indicator lamp to show that the system is "on," i.e. that the air flow from the duct 34 to the duct 42 is in fact taking place. The duct 44 is connected to a means (not shown) for producing a warning signal to an operator, e.g. the pilot of an aircraft in which the engine is installed. In addition, or alternatively, the output signal may be used to shut down the supply to the engine.

If, during the running of the engine, one of the blades 18 is damaged, i.e. broken or distorted, the regularity of the continuous annular wall defined by the blades is interrupted as indicated by a gap 54 (FIGURE 3). This gives rise to a change in the fluid pressure in the chamber 26, because the impedance to the radially outward movement of the fluid presented by the shrouds 22 is removed at the gap 54.

Clearly, the relay 32 will, as it is stationary relatively to the rotor, experience the fluid flow from the gaps 54 as a cyclic pressure fluctuation.

FIGURE 4 shows this pressure cycle diagrammatically. During rotation of the rotor 16, there exists in the chamber 26 a general pressure level 60 on which there can be superimposed small pressure pulses 56 which are experienced at any static point in the vicinity of the rotary blades 18. These are due to fluid issuing from the gaps between adjacent shrouds. The pneumatic relay 32 is arranged so that the fluid current crossing the junction from the inlet port 38 to the output port 42 is not deflected sufficiently by these small pulses to cause it to breakaway from its adjacent wall. If a blade is substantially damaged or lost, however, so that a much larger gap is present between the two blades, the fluid passing axially through the machine can flow more easily radially outwards through the greater gap, being motivated to do so by its static pressure and its centrifugal force. This gives rise to a large pressure pulse, seen as 58 in FIGURE 4, which is sufficient to deflect the flow through the device so that when crossing the junction it leaves instead by the outlet port 44.

The relay 32 is chosen to have a response time sufficiently short to respond to one of the pulses 58. The flow of fluid through the gap 54 also raises the general pressure level in the chamber 26 so that a positive backing is provided for the pulses 58 and the relay 32 would respond, if not to the first, then at least to one of the first few of the pulses 58.

Several of the relays 32 may be installed in peripherally spaced positions around the casing 10 so that, if one relay is damaged by failure of a blade, there is at least one other relay to detect the damage.

The valve 50 need not be normally closed. Depending on the design of the relay, it can remain open so that the flow from the port 38 has a permanent bias towards the duct 42. The flow through the duct 48 then has to be strong enough to overcome this bias. With this arrangement, the relay would not be bistable and a bistable device (not shown) is then provided to hold the signal output from the duct 44.

I claim:

1. A rotary-bladed fluid-flow machine having a casing, alternate rings of rotor blades and stator blades coaxially mounted within said casing, a pressure tapping passing through said casing, the inner part of said tapping lying coplanar with and radially outwards of a ring of rotor blades, a fluid pressure responsive device being operatively connected to said pressure tapping, said device being adapted to indicate danger when the pressure at said pressure tapping exceeds a predetermined value, the predetermined value being above that which arises when the machine is in use and when there are uniform gaps lying between the undamaged blades of a complete ring, but the value being less than that which arises when the blades of the rotor ring are other than undamaged and complete.

2. A machine as claimed in claim 1, in which said fluid pressure responsive device comprises a fluidic switch which has an entry passage, first and second exit passages, a biasing passage and a junction, all the passages opening into the junction, the first and second exit passages opening on the opposite side thereof to the entry passage, the biasing passage opening transversely to the entry, the first and the second passages; the device further comprising a working-fluid supplying means, and a danger indicating means, the working-fluid supplying means being connected to the entry passage, the danger indicating means being connected to the first exit passage, and the pressure tapping being connected to the biasing passage, the switch being adapted for fluid entering the entry passage during normal operation of the machine to pass across the junction and leave at the second exit passage, because the biasing caused by fluctuations arising from the uniform gaps between the blades of a complete and undamaged ring of blades are of less magnitude than the biasing caused by an abnormal fluctuation which would be sufficient to deflect the fluid to leave instead at the first exit passage and thereby actuate the danger indicating means, which abnormal fluctuation arises from the blade condition being other than undamaged and complete.

3. A machine as claimed in claim 1, forming part of a gas turbine engine which also includes a compressor, said device being a fluidic switch, and including a means connecting said compressor to said switch for supplying working-fluid from the former to the latter.

4. A machine as claimed in claim 1 in which each of said blades has a shroud at its tip, said shrouds in combination defining a substantially continuous cylindrical wall enclosing said blades and rotating with them, the responsive means being mounted radially outwards of said shrouds.

5. A machine as claimed in claim 2, in which said fluidic switch has a second biasing passage connected into said junction, said passage generally directing a current of fluid to bias said normal flow into said first exit passage, said current being tapped, and throttled, from the source of said normal flow.

References Cited

UNITED STATES PATENTS

| | | |
|---|---|---|
| 1,634,897 | 7/1927 | Davis. |
| 2,677,273 | 5/1954 | Johnson. |
| 3,232,533 | 2/1966 | Boothe. |
| 3,248,043 | 4/1966 | Taplin et al. |
| 3,260,271 | 7/1966 | Katz. |
| 3,292,648 | 12/1966 | Colston. |

EVERETTE A. POWELL, JR., *Primary Examiner.*